United States Patent [19]
Shida et al.

[11] Patent Number: 5,501,719
[45] Date of Patent: Mar. 26, 1996

[54] GROUND STRENGTHENING/SOIL-IMPROVING MATERIAL

[75] Inventors: Yukimori Shida, deceased, late of Kanagawa; by Chieko Shida, executor; by Yoshitaka Shida, executor, both of Yokohama; by Mutsuho Shida, executor, Shizuoka; by Yukie Takarazawa, executor; by Emiko Shida, executor, both of Yokohama, all of Japan

[73] Assignee: Tokiwa Kogyo Co., Ltd., Japan

[21] Appl. No.: 274,824

[22] Filed: Jul. 14, 1994

Related U.S. Application Data

[63] Continuation-in-part of Ser. No. 809,023, Dec. 16, 1991, abandoned, which is a continuation of Ser. No. 332,004, Mar. 3, 1989, abandoned.

[30] Foreign Application Priority Data

Mar. 17, 1989 [JP] Japan ..................................... 1-63777

[51] Int. Cl.⁶ ............................... C05F 5/00; C05G 3/04
[52] U.S. Cl. ..................... 72/25; 71/26; 71/63; 71/903; 71/904; 106/773; 106/900; 405/263
[58] Field of Search ................................. 71/903, 904, 1, 71/25, 26, 41, 63; 106/764, 772, 773, 900; 405/263, 264, 270

[56] References Cited

U.S. PATENT DOCUMENTS

| | | | |
|---|---|---|---|
| 3,476,511 | 11/1969 | Sullivon | 423/11 X |
| 4,443,260 | 4/1984 | Mioyshi et al. | 106/715 |
| 4,536,376 | 8/1985 | Loblich | 71/41 X |
| 4,765,822 | 8/1988 | Barber | 71/41 X |

FOREIGN PATENT DOCUMENTS

| | | | |
|---|---|---|---|
| 1203195 | 9/1986 | Japan | 71/903 |

*Primary Examiner*—Ferris Lander
*Attorney, Agent, or Firm*—Klauber & Jackson

[57] ABSTRACT

Utilizing exhaust materials from various plants and industrial wastes containing $CaO$, $Al_2O_3$, $SiO_2$ and $Fe_2O_3$ as major components, inexpensive ground-strengthening/soil-improving material is obtained by blending thereinto clay minerals and sintering the resultant mixture. A high unconfined compressive strength is conferred upon the ground-strengthening/soil-improving material upon the addition of alumina.

11 Claims, No Drawings

GROUND STRENGTHENING/SOIL-IMPROVING MATERIAL

CROSS-REFERENCE TO RELATED APPLICATION

This application is a continuation-in-part of application Ser. No. 07/809,023 filed Dec. 16, 1991 and now abandoned which in turn is a continuation of application Ser. No. 7/332,004 filed Mar. 31, 1989 and now abandoned.

BACKGROUND OF THE INVENTION

1. Field of the Invention

This invention relates to ground-strengthening/soil-improving material utilizing exhaust materials from various plants and industrial wastes.

2. Description of the Prior Art

There have thus far been in use various ground-strengthening materials and soil-improving materials (hereinafter referred to as "ground-strengthening/soil-improving material" for brevity) for consolidating seaside grounds, lowland grounds and damp grounds prior to construction of roads or other structures. Most of these materials are of a cement-base type and usually blended with gypsum or other hydraulic or hydro-setting organic and/or inorganic materials. Also known in the art are water glass-base materials which are blended with other hydraulic substances.

On the other hand, according to the current practice in the art, the increasing exhaust materials from various plants and industrial wastes are used for reclamation of land or otherwise simply discarded into the ocean.

The conventional ground-strengthening/soil-improving materials, however, are mostly of the cement-base types blended with a cement which is produced by grinding rocks of limestone by the use of a crusher after collection at the place of origin and then transferring same to a plant for calcination. This is hardly to be considered advantageous costwise. In most cases, the exhausts from various plants and industrial wastes have been simply discarded without finding any effective uses.

Under these circumstances, Applicant conducted analytic studies on chemical compositions of exhausts from various plants and industrial waste materials, and found that they contained large amounts of substances which could be utilized as effective components of ground-strengthening/soil-improving materials, proposing "A Ground Strengthening and Improving Material Utilizing Exhaust Materials from Various Plants" in his prior Japanese Laid-Open Patent Application 61-218684. This ground strengthening and improving material employs as a base calcined powder of various plants exhausts which contain CaO, $Al_2O_3$, $Fe_2O_3$ and $SiO_2$ as major components and has at least one kind of hydraulic substance, presenting a composition containing $SiO_2$, $Al_2O_3$, $Fe_2O_3$, CaO, MgO, $Na_2O$ and $K_2O$ as essential components.

SUMMARY OF THE INVENTION

The ground strengthening and improving material in the above-mentioned prior patent application succeeded in achieving the initial objective, i.e., the effective use of exhaust materials from various plants. However, there has been a strong demand for further cost reduction of this sort or ground-strengthening/soil-improving material which is consumed in a large amount. There has also been a demand for improvements in properties, especially in expansion coefficient of the ground-strengthening/soil-improving material.

My further studies in this regard revealed that, by supplementing CaO, $Al_2O_3$, $SiO_2$ and $Fe_2O_3$ from clay minerals instead of using a cement in the stage of calcination of the base material, consumption of other materials can be reduced, and that addition of alumina to the composition improves the properties as a ground-strengthening/soil-improving material, particularly its expansion coefficient.

It is an object of the present invention to provide a ground-strengthening/soil-improving material using as a base material a calcined product of a mixture consisting of exhaust materials from various plants or industrial wastes and clay minerals and containing relatively large amounts of CaO, $Al_2O_3$, $SiO_2$ and $Fe_2O_3$ as major components, and further blended with gypsum.

The above and other objects, features and advantages, of the invention will become apparent from the following description of preferred embodiments and the appended claims.

DESCRIPTION OF PREFERRED EMBODIMENTS

Exhaust materials discharged from various plants and other industrial wastes, including sludge cakes discharged from a crude sugar refining stage in a sugar refining plant, ashes discharged from an incinerator in a paper-making plant, iron rust sludge discharged from an iron factory or steel slags, rolling slags occurring in the aluminum manufacturing process, beer filtration sludges and the like, in many cases contain CaO, $Al_2O_3$, $SiO_2$ and $Fe_2O_3$. Accordingly, exhausts or wastes which contain an abundance of CaO, $Al_2O_3$, $SiO_2$ and $Fe_2O_3$, are mixed with clay minerals and calcined at a temperature of about 1200° to 1600° C. to obtain a calcined product which serves as the base material.

Examples of the above-mentioned exhausts from various plants and industrial waste materials are shown in Table 1. Needless to say, the present invention uses exhaust or waste materials which do not contain any precious metals. Examples of mixing clay minerals are shown in Table 2.

TABLE 1

| MATERIALS | COMPONENTS | | | | | | IGNITION | |
| | $SiO_2$ | $Al_2O_3$ | $Fe_2O_3$ | CaO | MgO | OTHERS | LOSS | TOTAL |
| --- | --- | --- | --- | --- | --- | --- | --- | --- |
| SLUDGE FROM SUGAR REF. | 11.7 | 2.27 | 0.37 | 37.36 | 0.61 | 1.51 | 45 | 98.82 |
| INCINERATOR ASH IN P.M. | 39.3 | 3.3 | — | 0.67 | 0.60 | 1.30 | 54.1 | 99.27 |
| IRON RUST | 0.04 | 0.11 | 59.3 | 0.34 | 0.015 | 2.725 | 30.6 | 93.13 |

TABLE 1-continued

| MATERIALS | COMPONENTS | | | | | | IGNITION LOSS | TOTAL |
|---|---|---|---|---|---|---|---|---|
| | $SiO_2$ | $Al_2O_3$ | $Fe_2O_3$ | CaO | MgO | OTHERS | | |
| SLUDGE | | | | | | | | |
| IRON & STEEL SLAG | 29.9 | 2.0 | 1.86 | 54.7 | 0.4 | — | — | 88.86 |
| ALUMINUM ROLL. SLAG | 47.9 | 0.6 | 0.13 | 0.02 | 0.02 | — | 45.5 | 94.17 |
| BEER FILT. SLUDGE | 82.5 | 3.2 | 0.79 | 0.38 | — | 2.24 | 9.26 | 98.37 |

TABLE 2

| MATERIALS | COMPONENTS | | | | | | IGNITION LOSS | TOTAL |
|---|---|---|---|---|---|---|---|---|
| | $SiO_2$ | $Al_2O_3$ | $Fe_2O_3$ | CaO | MgO | $Na_2O_3$ | | |
| PYROPHYLLITE | 65.8 | 18.25 | 4.07 | 2.02 | 1.42 | — | 3.53 | 95.09 |
| MONTMORILLONITE | 58.8 | 14.2 | 3.0 | 0.7 | — | 3.4 | — | 80.1 |
| SELINITE | 47.4 | 37.22 | 0.15 | 0.14 | 0.34 | 0.21 | — | 85.46 |
| KAOLINITE | 45.5 | 37.1 | 0.4 | 0.9 | — | 0.5 | — | 84.4 |
| TUFF CLAY | 53.34 | 17.94 | 13.63 | 1.66 | 2.09 | — | 5.40 | 94.06 |
| KANTO-LOAM | 47.16 | 27.51 | 10.64 | 0.17 | 0.62 | — | — | 86.1 |

As shown in Tables 1 and 2, after burning off organic components, the exhausts from various plants and industrial waste materials as well as clay mineral contain inorganic components which can be utilized in the present invention to a certain extent depending upon the nature of the material.

The above-mentioned calcined product is a cement clinker, to which gypsum is added as a "setting retarding material" for the purpose of adjusting the setting time of the base material although the addition of gypsum is also effective for supplementing deficient components. In this instance, the calcined product (cement clinker) is pulverized to serve as the base material. This increases the viscosity and coefficient of water absorption, advantageously improving the hardenability. As regards gypsum, the hemihydrate type is easier to handle. Namely, the hemihydrate with a lower moisture content than the normally used dihydrate type is less susceptible to setting by water adsorption and therefore easier to handle. When the hydraulicity of the calcined product is adjusted to 1.7 to 2.4, it is expected to be able to meet the setting conditions as imposed on ordinary portland cements or to show higher setting property. In a case where calcium is deficient, it is desirable to add calcium carbonate for the adjustment of hydraulicity, from an economic point of view. Further, when the soil to be reformed is of the nature which contains organic substances or humin and amine like dy, for example, the hydraulicity is changed by adjusting the composition accordingly. Moreover, the addition of about 10 to 20 wt % of alumina to the composition is preferable since it will expand the volume by about 0.5 to 10% and urge setting and hardening by the ground consolidating phenomenon.

Now the invention is illustrated more particularly by way of examples.

As the exhausts from various plants and industrial waste materials, sludge from sugar refining process, incineration ash from paper-making, iron rust sludge, and slag from aluminum rolling process were selected for use and, after blending thereinto Kanto-loam which was selected as the clay mineral, calcined and pulverized to serve as the base material. Depending upon the intended hydraulicity, calcium carbonate was added for calcium supplementation. Hemihydrate then added to obtain the desired ground-strengthening/soil-improving material. The composition of the material as a whole was shown in Table 3 below.

TABLE 3

| MATERIALS | COMPONENTS | | | | | IGNITION LOSS | TOTAL |
|---|---|---|---|---|---|---|---|
| | $SiO_2$ | $Al_2O_3$ | $Fe_2O_3$ | CaO | MgO | | |
| SLUDGE FROM SUGAR REF. | 11.7 | 2.27 | 0.37 | 37.36 | 0.61 | 46.51 | 98.82 |
| INCINERATOR ASH IN P.M. | 39.3 | 3.3 | — | 0.67 | 0.60 | 55.41 | 99.28 |
| IRON RUST SLUDGE | 0.04 | 0.11 | 59.3 | 0.34 | 0.015 | 33.325 | 93.13 |
| ALUMINUM ROLL. SLAG | 47.9 | 0.6 | 0.13 | 0.02 | 0.02 | 45.5 | 94.17 |
| KANTO-LOAM | 47.16 | 27.51 | 10.64 | 0.17 | 0.62 | — | 86.1 |
| CALCIUM CARBONATE | — | 0.3 | — | 54.7 | 0.4 | 43.2 | 98.6 |
| *HEMIHYDRATE | 0.2 | 0.2 | — | 32.0 | **46.4 | 19.0 | 97.8 |

*Mexican product
**$SO_3$

<EXAMPLE 1>

In this example, the amounts of the respective additives were adjusted on the basis of the components of Table 3, preparing the composition as shown in Table 4 below.

TABLE 4

| MATERIALS | COMPONENTS | | | | | ADDITIVE |
|---|---|---|---|---|---|---|
| | $SiO_2$ | $Al_2O_3$ | $Fe_2O_3$ | CaO | MgO | AMOUNT (%) |
| SLUDGE FROM SUGAR REF. | 585 | 113.5 | 18.5 | 1868 | 30.5 | 50 |
| INCINERATOR ASH IN P.M. | 550 | 46.2 | — | 9.38 | 8.4 | 14 |
| IRON RUST SLUDGE | 0.04 | 0.11 | 59.3 | 0.34 | 0.015 | 1 |
| ALUMINUM ROLL. SLAG | 479 | 0.6 | 1.3 | 0.2 | 0.2 | 10 |
| KANTO-LOAM | 1179 | 687.75 | 266 | 4.25 | 15.5 | 25 |
| CALCIUM CARBONATE | — | 24 | — | 4376 | 32 | 80 |
| Total (%) | 27.93 | 8.78 | 3.45 | 62.58 | 0.87 | — |

Then, hemihydrate was added to the base material of Table 4 to obtain the ground-strengthening/soil-improving material of the composition shown in Table 5 below.

TABLE 5

| MATERIALS | COMPONENTS | | | | | | TOTAL | REMARKS |
|---|---|---|---|---|---|---|---|---|
| | $SiO_2$ | $Al_2O_3$ | $Fe_2O_3$ | CaO | MgO | $SO_3$ | | |
| Base M. | 22.93 | 8.78 | 3.45 | 62.58 | 0.87 | — | 103.61 | |
| Hemihydrate | 0.04 | 0.04 | — | 6.4 | — | 9.28 | — | ADDED 20% |

The 20% addition of hemihydrate resulted in a hydraulicity of 1.71.

<EXAMPLE 2>

In this example, the amounts of the respective additives were adjusted on the basis of the components of Table 3, preparing the composition as shown in Table 6 below.

Hemihydrate was added to the base material of Table 6 to prepare the ground-strengthening/soil-improving material of the composition as shown in Table 7 below.

TABLE 6

| MATERIALS | COMPONENTS | | | | | ADDITIVE |
|---|---|---|---|---|---|---|
| | $SiO_2$ | $Al_2O_3$ | $Fe_2O_3$ | CaO | MgO | AMOUNT (%) |
| SLUDGE FROM SUGAR REF. | 643.5 | 124.85 | 20.35 | 2054.8 | 33.55 | 55 |
| INCINERATOR ASH IN P.M. | 393 | 33 | — | 6.7 | — | 10 |
| IRON RUST SLUDGE | 0.04 | 0.11 | 59.3 | 0.34 | 0.015 | 1 |
| ALUMINUM ROLL. SLAG | 479 | 6.0 | 1.3 | 0.2 | 0.2 | 10 |
| KANTO-LOAM | 1132 | 660 | 255 | 4.08 | 14.88 | 24 |
| CALCIUM CARBONATE | — | 24 | — | 4376 | 32 | 80 |
| Total (%) | 26.47 | 8.48 | 3.36 | 64.42 | 0.87 | — |

TABLE 7

| MATERIALS | COMPONENTS | | | | | | REMARKS |
|---|---|---|---|---|---|---|---|
| | $SiO_2$ | $Al_2O_3$ | $Fe_2O_3$ | CaO | MgO | $SO_3$ | |
| Base M. | 26.47 | 8.48 | 3.36 | 64.42 | 0.87 | — | |
| Hemihydrate | 0.02 | 0.02 | — | 3.2 | — | 4.64 | ADDED 10% |

The 10% addition of hemihydrate resulted in a hydraulicity of 1.76.

<EXAMPLE 3>

1.0% of alumina and 20% of hemihydrate were added to the base material of Table 6 to prepare the ground-strengthening/soil-improving material shown in Table 8 below.

TABLE 8

| MATERIALS | COMPONENTS | | | | | | TOTAL | REMARKS |
|---|---|---|---|---|---|---|---|---|
| | $SiO_2$ | $Al_2O_3$ | $Fe_2O_3$ | CaO | MgO | $SO_3$ | | |
| Base M. | 26.47 | 8.48 | 3.36 | 64.42 | 0.87 | — | 103.60 | |
| Hemihydrate | 0.04 | 0.04 | — | 6.4 | — | 9.28 | 15.76 | ADDED 20% |
| $Al_2O_3$ | — | 1.0 | — | — | — | — | 1.0 | ADDED 1.0 |

In this case, the hydraulicity was 1.80, the expansion coefficient was 0.5% of the entire volume, the gelling time was 1.5 minutes, and the setting and hardening time was 30 minutes.

<EXAMPLE 4>

1.0% of alumina and 20% of hemihydrate were added to the base material of Table 6 to prepare the ground-strengthening/soil-improving material shown in Table 9 below.

TABLE 9

| MATERIALS | COMPONENTS | | | | | | REMARKS |
|---|---|---|---|---|---|---|---|
| | $SiO_2$ | $Al_2O_3$ | $Fe_2O_3$ | CaO | MgO | $SO_3$ | |
| Base M. | 26.47 | 8.48 | 3.36 | 64.42 | 0.87 | — | |
| Hemihydrate | 0.02 | 0.02 | — | 3.2 | — | 4.64 | ADDED 10% |
| $Al_2O_3$ | — | 1.0 | — | — | — | — | ADDED 1.0% |

In this case, the hydraulicity was 1.72, the expansion coefficient was 0.8 to 10% of the entire volume, the gelling time was 2 minutes, and the setting and hardening time was 35 minutes.

The ground-strengthening and soil-improving effects of the respective examples were as shown in the following test examples.

<TEST EXAMPLE 1>

The ground-strengthening/soil-improving material of Example 1 was added to Kanto-loam with a water content ratio of 100% and mixed therewith at a rate of 15% to obtain test sample A. Test sample A was placed in a mold, and on the third day was removed from the mold and placed in a plastic bag. After four days of moist curing in the bag, test sample A was subjected to a compression test, and was found to have a confined compressive strength of 2.1 kgf/cm².

<TEST EXAMPLE 2>

The ground-strengthening/soil-improving material of Example 2 was added to Kanto-loam with a water content ratio of 120% and mixed therewith at a rate of 15% to obtain test sample B. Test sample B was placed in a mold, and on the third day was removed from the mold and placed in a plastic bag. After four days of moist curing in the bag, test sample B was subjected to a compression test, and was found to have a confined compressive strength of 2.0 kgf/cm².

<TEST EXAMPLE 3>

Hemihydrate was added to and blended with test sample A at a rate of 20%, and this was added to Kanto-loam with a water content ratio of 120% and mixed therewith at a rate of 20% to obtain test sample C. Test sample C was placed in a mold, and on the third day was removed from the mold and placed in a plastic bag. After four days of moist curing in the bag, test sample C was subjected to a compression test, and was found to have a confined compressive strength of 5.4 kgf/cm².

<TEST EXAMPLE 4>

Hemihydrate was added to and blended with test sample B at a rate of 20%, and this was added to Kanto-loam with a water content ratio of 120% and mixed therewith at a rate of 20% to obtain test sample D. Test sample D was placed in a mold, and on the third day was removed from the mold and placed in a plastic bag. After four days of moist curing in the bag, test sample D was subjected to a compression test, and was found to have a confined compressive strength of 6.3 kgf/cm$^2$.

The foregoing results obtained from Test Examples 1 to 4 proved that test samples A to D all had sufficient compressive strength.

<TEST EXAMPLE 5>

The ground-strengthening/soil-improving materials of Examples 1 and 2 were each blended at a rate of 20% with methane gas-releasing organic silt (pH=5.5–6) from the edge of the Ohba River in Saitama prefecture, and the respective specimens were subjected to compressive testing after the same treatments as in Test Example 1. This test revealed that both specimens had an insufficiently-low confined compressive strength of 1.3–1.9 kgf/cm$^2$. Next, the ground-strengthening/soil-improving material of Example 3 was blended into the same organic silt at a rate of 20%, and, after the same treatment, the resulting specimen was subjected to a compression test. As a result, it was found to have a sufficiently high confined compressive strength of 2.8 kgf/cm$^2$.

It has been learned that, of the ground-strengthening/soil-improving materials with a hydraulicity of 1.7–2.4 similar to that of an ordinary portland cement, the materials with an increased hemihydrate content (e.g. the ground-strengthening/soil-improving material of Example 3 with a hemihydrate content of 20%) is more effective for strengthening and improving organic silt or acidic soft ground. It has also been learned that the soil-improving materials added with 1.0–2.0% of alumina (e.g. Examples 3 and 4) are particularly useful for accelerating consolidation and gelation of the ground, for example, for strengthening and improving the ground in the course of ground work on a building lot or the like and for shortening the working period.

What is claimed is:

1. A ground-strengthening/soil-improving material comprising a base material produced by calcining, at a temperature of 1200°–1600° C., clay minerals selected from the group consisting of pyrophyllite, montmorillonite, selinite, kaolinite, tuff clay and kanto-loam admixed, prior to calcining, with materials selected from the group consisting of:
   (a) 50–55 wt. % of sludge cakes discharged from a crude sugar refining stage in a sugar refinery;
   (b) 10–14 wt. % of ash discharged from an incinerator in a papermaking plant;
   (c) 1 wt. % of iron rust discharged from an iron factory or steel slags;
   (d) 10 wt. % of rolling slags occurring in an aluminum manufacturing process,
   said materials containing CaO, Al$_2$O$_3$, SiO$_2$ and Fe$_2$O$_3$ as major components and wherein 10–20 wt. % of gypsum is admixed with said base material after calcining.

2. A ground-strengthening/soil-improving material as defined in claim 1, wherein the base material is finely pulverized and the gypsum is hemihydrated gypsum.

3. A ground-strengthening/soil-improving material as defined in claim 2, wherein the base material has a hydraulicity of 1.7–2.4.

4. A ground-strengthening/soil-improving material as defined in claim 2, wherein 1.0–3.0 wt. % of alumina is admixed with said base material as an additive component.

5. A ground-strengthening/soil-improving material as defined in claim 1, wherein the base material has a hydraulicity of 1.7–2.4.

6. A ground-strengthening/soil-improving material as defined in claim 5, wherein 1.0–3.0 wt. % of alumina is admixed with said base material as an additive component.

7. A ground-strengthening/soil-improving material as defined in claim 1, wherein 1.0–3.0 wt. % of alumina is admixed with said base material as an additive component.

8. A ground-strengthening/soil-improving material comprising an admixture of:
   (a) a base material produced by calcining at a temperature of 1200°–1600° C. a mixture of materials discharged from various plants and/or industrial waste materials, said materials discharged and said waste materials containing CaO, Al$_2$O$_3$, SiO$_2$ and Fe$_2$O$_3$ as major components and further including clay minerals selected from the group consisting of pyrophyllite, montmorillonite, selinite, kaolinite, tuff clay and kanto-loam and having a relationship meeting the following standard hydraulic equation:

$$\frac{CaO}{Al_2O_3 + SiO_2 + Fe_2O_3} = 1.7\text{--}2.4;$$

and
   (b) 10–20 wt. % of gypsum admixed with said base material after calcining.

9. A ground-strengthening/soil-improving material as defined in claim 8, wherein said calcined mixture is finely pulverized, and said gypsum is hemihydrated gypsum.

10. A ground-strengthening/soil-improving material as defined in claim 9, wherein 1.0–3.0 wt. % of alumina is admixed with said base material as an additive component.

11. A ground-strengthening/soil-improving material as defined in claim 8, wherein 1.0–3.0 wt. % of alumina is admixed with said base material as an additive component.

* * * * *